United States Patent
Yamagishi

(10) Patent No.: US 7,304,696 B2
(45) Date of Patent: Dec. 4, 2007

(54) IMAGE DISPLAY

(75) Inventor: Machio Yamagishi, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/204,733

(22) PCT Filed: Dec. 25, 2001

(86) PCT No.: PCT/JP01/11386

§ 371 (c)(1),
(2), (4) Date: Oct. 18, 2002

(87) PCT Pub. No.: WO02/052338

PCT Pub. Date: Jul. 4, 2002

(65) Prior Publication Data

US 2003/0107688 A1    Jun. 12, 2003

(30) Foreign Application Priority Data

Dec. 25, 2000  (JP) ............................. 2000-391751

(51) Int. Cl.
*G02F 1/1335* (2006.01)
(52) U.S. Cl. ........................................ 349/69; 349/114
(58) Field of Classification Search ............ 349/68–71, 349/113–114, 61–64
See application file for complete search history.

(56) References Cited

U.S. PATENT DOCUMENTS 4,772,885 A * 9/1988 Uehara et al. ................ 349/71
6,281,952 B1 * 8/2001 Okamoto et al. ............. 349/12
6,493,051 B2 * 12/2002 Ha et al. ..................... 349/113
6,680,765 B1 * 1/2004 Maeda et al. ............... 349/117
6,750,932 B2 * 6/2004 Kim ............................ 349/114

FOREIGN PATENT DOCUMENTS

| JP | 11-249130 | 9/1999 |
|---|---|---|
| JP | 2000-187220 | 7/2000 |

* cited by examiner

*Primary Examiner*—Dung T. Nguyen
(74) *Attorney, Agent, or Firm*—Sonnenschein Nath & Rosenthal LLP

(57) ABSTRACT

The present invention is an image display apparatus having pixels PXLs arranged in a matrix form, and comprises a display panel displaying images by reflecting external light from the front side or by having illumination light from the back side transmit therethrough, and a flat-type back light arranged at the back of the display panel and radiating the illumination light. Each pixel PXL is divided on a flat surface into a reflection area R for reflecting the external light incident from the front side of the display panel to display an image and a transmission area T for transmitting the illumination light incident from the back side of the display panel to display an image. The back light is a flat type, with layers consisting of electrodes (204), (202) and a luminescent layer (203) sandwiched inbetween being formed on a substrate (201), and radiates the illumination light generated from the luminescent layer (203) toward the transmission area T of each pixel PXL when voltage is applied between the electrodes (204), (202).

16 Claims, 6 Drawing Sheets

IMAGE DISPLAY

TECHNICAL FIELD

The present invention relates to a, so to speak, hybrid-type image display apparatus provided on the back with a reflective layer on a part of which is formed an opening (hereinafter, sometimes called a semi-transmission reflective layer).

BACKGROUND OF THE INVENTION

A hybrid-type display apparatus is disclosed e.g. in a Japanese patent laid-open No. 11-52366 and a Japanese patent laid-open No. 11-183892. The hybrid-type image display apparatus performs a reflective display using external light by reflecting on a semi-transmission reflective layer on the back side the external light incident from the front side when the external light having sufficient brightness (such as natural light or interior light) is obtained, and performs a transmittive display using illumination light which is a back light arranged on the back side of the image display apparatus when the external light having sufficient brightness is not obtained. This hybrid-type image display apparatus basically comprises a display panel having pixels arranged in a matrix form and displaying images by reflecting external light from the front side or by having illumination light from the back side transmit therethrough, and a flat-type back light arranged at the back of the display panel and radiating the illumination light.

Such a hybrid-type image display apparatus is preferably applied particularly to a display section of a portable information terminal device or a portable telephone terminal device. As the external light can be used when it is bright around, it is not necessary to turn on the back light, and thus electric power consumption can be reduced. In the portable information terminal device or the portable telephone terminal device in which electric power supply is limited, it is the most important point to reduce the electric power consumption.

Conventionally, an LED or a fluorescent tube is used as the back light. Accordingly, the thickness of the back light cannot be 2 mm or thinner. Although there will be raised an increasing demand for reducing the thickness of a portable device in the future, the conventional back light cannot satisfy the demand of reducing its thickness. Thus, there is a need for newly developing a back light structure suitable for a hybrid-type image display apparatus. Meanwhile, an EL is used as a conventional back light, as well as the LED or the fluorescent tube, and such a back light is disclosed in a Japanese patent laid-open No. 11-316376. The art disclosed in this laid-open patent is not used in a hybrid-type image display apparatus.

SUMMARY OF THE INVENTION

It is an object of the present invention to provide a new image display apparatus that can solve the technical problems that the above-mentioned conventional apparatuses have.

In order to solve the above technical problems, the present invention provides an image display apparatus comprising a display panel having pixels arranged in a matrix form and displaying images by reflecting external light from the front side or by having illumination light from the back side transmit therethrough, and a flat-type back light arranged at the back of the display panel and radiating the illumination light. Each pixel constituting this apparatus is divided on a flat surface into a reflection area for reflecting the external light incident from the front side of the display panel to display an image and a transmission area for transmitting the illumination light incident from the back side of the display panel to display an image. The back light is a flat type, with layers consisting of electrodes and a luminescent layer sandwiched inbetween being formed on a substrate, and radiates the illumination light generated from the luminescent layer toward the transmission area of each pixel when voltage is applied between the electrodes.

In the present invention, the luminescent layer is preferably composed of an organic electro-luminescent material. The shape of the layers consisting of the electrodes and the luminescent layer sandwiched inbetween is manufactured to match that of the transmission area so that the luminescent light may be supplied only to the transmission area of each pixel. The display panel comprises a pair of upper and lower substrates to each of which is formed an electrode, and liquid crystal held between the substrates. The back light has a polarizing layer deposited on the layers consisting of the electrodes and the luminescent layer sandwiched inbetween, and the liquid crystal displays an image, effected by the illumination light transmitted through the polarizing layer.

In the present invention, a thin-film element using a self luminescent material is used as a back light of the hybrid-type image display apparatus. A self luminescent material is exemplified by an organic electro-luminescent (EL) material. A luminescent layer of the organic EL is formed on a substrate. A glass substrate or the like can be used as the substrate. On the glass substrate is formed a lower electrode, on which is deposited the luminescent layer made of the organic EL material. Further, an upper electrode made of a transparent electro-conductive film is formed on the luminescent layer such that the organic EL film is sandwiched between the upper and lower electrodes. When voltage is applied between the upper and lower electrodes, current flows in the luminescent layer, and the organic EL material illuminates. The flat-type back light prepared in such a process is 1 mm or thinner in thickness, and is used attached to the back surface of the display panel. This back light may be arranged to a peripheral portion of the back surface of the display panel. The organic EL radiates while luminescent light depending on driving current, and can be used as illumination light. The shape of the material constituting the luminous element is patterned to match that of the transmission area included in each pixel formed in the display panel, to reduce unnecessary luminescence. Thus, current consumption can be minimized.

Other objects and advantages of the present invention will become apparent from the following description of the preferred embodiments and the claims.

DETAILED DESCRIPTION OF THE PRESENTLY PREFERRED EMBODIMENTS

Preferred embodiment of the present invention will now be described with reference to the drawings.

Figure 1A:
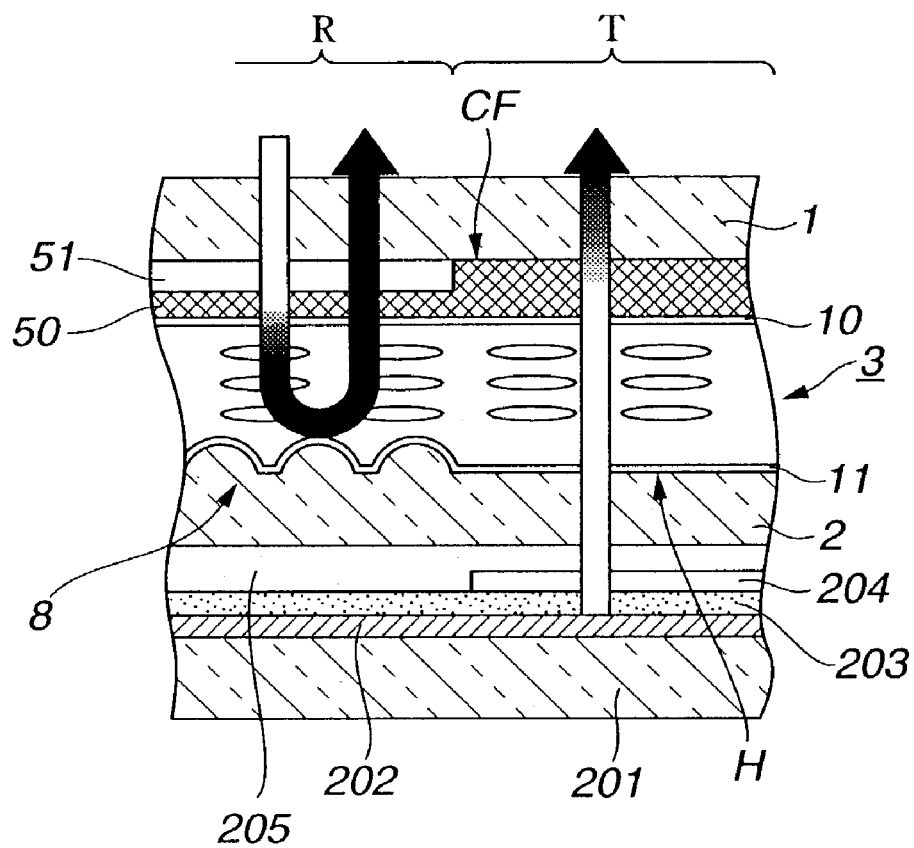
FIG. 1A is a partial cross-sectional view showing a basic structure of an image display apparatus according to the present invention.
Figure 1B:
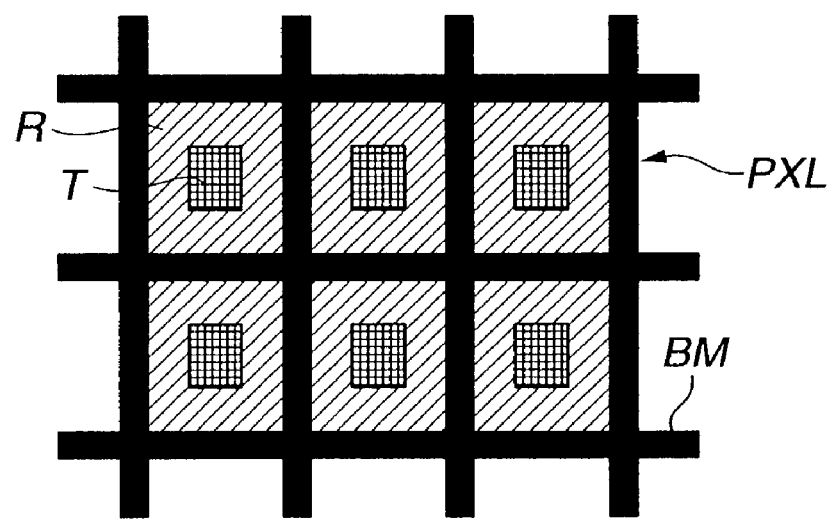
FIG. 1B is a partial plan view of the apparatus.

FIGS. 1A and 1B are schematic views showing a basic structure of a hybrid-type image display apparatus according to the present invention.

The hybrid-type image display apparatus basically comprises a display panel having pixels arranged in a matrix form and displaying images by reflecting external light from the front side or by having illumination light from the back side transmit therethrough, and a flat-type back light arranged at the back of the display panel and radiating the illumination light.

FIG. 1A shows a cross-sectional structure of the apparatus for a pixel. As shown in the figure, the display apparatus comprises a display panel having a pair of substrates 1, 2 at the front and back arranged to face to each other. On the inner surface of one substrate 1 is formed one electrode 10, and on the inner surface of the other substrate 2 is formed the other electrode 11. At a portion where the one electrode 10 and the other electrode 11 face to each other is formed a pixel. A color filter CF is provided on the front substrate 1 to match the pixel. Between the pair of the substrates 1, 2 at the front and back is held, for example, a liquid crystal layer 3 as an electronic optical layer. This liquid crystal layer 3 is a guest-host liquid crystal, and blocks the incident light or lets the incident light pass therethrough per a pixel, in response to the voltage applied between the electrodes 10 and 11.

It is to be noted that the electronic optical element of the present invention is not limited to the liquid crystal, but may be another electronic optical element. The liquid crystal is not limited to a guest-host liquid crystal, but may be a liquid crystal of another mode.

On the back substrate 2 is provided a reflective layer 8. The reflective layer 8 has an opening H for each pixel, and divides each pixel into a transmission area T inside the opening and a reflection area R outside the opening on a flat surface. In the present embodiment, the reflective layer 8 is composed of a metal film formed on the convexoconcave surface of the substrate 2 and also works as the above-mentioned electrode 11. Also, on the transmission area T is formed a transparent electro-conductive film such as an ITO, which serves both as the above-mentioned opening and as the electrode 11. As apparent from the above description, the electrode 11 formed on the substrate 2 has a hybrid structure having the metal film provided in the reflection area R and the transparent electro-conductive film provided in the transmission area T in the present embodiment.

The color filter CF is composed of a colored layer 50 and a transparent layer 51. The colored layer 50 is thinner in the reflection area R than in the transmission area T. The transparent layer 51 is formed to fill the gap of the colored layer 50 generated between the transmission area T and the reflection area R. More specifically, the transparent layer 51 is composed of a transparent resin film formed on the inner surface of the front substrate 1, and the colored layer 50 is composed of a colored film formed piled on the transparent resin film. The thickness of the transparent layer 51 is set to the optimum one to adjust the optical density of the colored layer 50 both in the transmission area T and in the reflection area R.

As described above, in the hybrid-type display apparatus, a transparent resin film such as an acrylic resin is selectively formed only on the reflection area R by a method such as photo-lithography, and the colored layer 50 is layered on the transparent resin film. In the transmission area T, incident light (back light) passes once through the color filter CF having enough thickness normally, thus to obtain desired color reproducibility. In the reflection area R, incident light (external light) passes twice back and forward through the color filter CF having lower optical density due to the intervention of the transparent resin film, thus to obtain desired color reproducibility. In this case, as the colored layer 50 in the reflection area R is thin in thickness, the external light is not extremely absorbed regardless of passing twice through the color filter CF, but can maintain high reflectance and thus maintain the brightness of the screen at a practical level.

On the back surface side of the display panel structured as above is mounted a flat back light. This back light shapes flat, having layers consisting of electrodes 204, 202 and a luminescent layer 203 sandwiched inbetween, formed on a substrate 201 made of a glass board or the like. These layers are protected by a transparent protective layer 205. The lower electrode 202 is made of a metal film, and the upper electrode 204 is made of a transparent electro-conductive film such as an ITO. When the voltage is applied between the upper electrode 204 and the lower electrode 202, the current flows in the luminescent layer 203 to obtain white illumination light. The illumination light is radiated toward the transmission area T of each pixel. The luminescent layer 203 is made of, for example, an organic electro-luminescent material. The shape of the layers consisting of the electrodes 204, 202 and the luminescent layer 203 sandwiched inbetween is processed to match that of the transmission area T so that the illumination light may be radiated only to the transmission area T of each pixel. As a result, unnecessary luminescence is prevented, and current consumption is reduced. In the present embodiment, the shape of the upper electrode 204 is patterned to match the shape of the transmission area T. Generally, at least one layer of the lower electrode 202, the luminescent layer 203 and the upper electrode 204 may be patterned to conform with the shape of the transmission area T.

FIG. 1B is a schematic view showing a flat shape of the image display apparatus according to the present invention. As shown in the figure, pixels PXLs are partitioned in a matrix form by a black matrix BM. Each of the pixels PXLs is divided on a flat surface into a transmission area T at the center and a reflection area R around the transmission area T on a flat surface, and has a, so to speak, hybrid structure. To conform with this flat division, the aforementioned back light is patterned, and a substantial luminescent area of which is formed on the portion that matches the transmission area T. Also, the color filter is patterned to approximately correspond to each of the pixels PXLs partitioned by the black matrix BM.

Next, an example of a method for manufacturing the back light shown in FIG. 1 will be described with reference to FIGS. 2A to 2D.

Figure 2A:
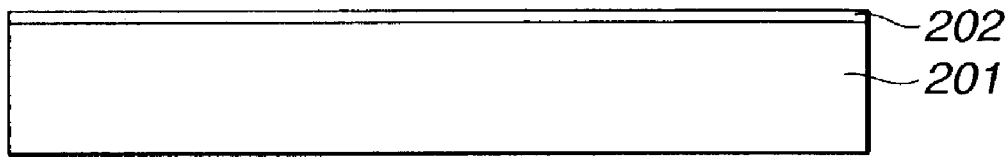
FIGS. 2A to 2D are cross-sectional views showing a method for manufacturing a back light incorporated in the image display apparatus shown in FIG. 1 in a process order.
Figure 2B:
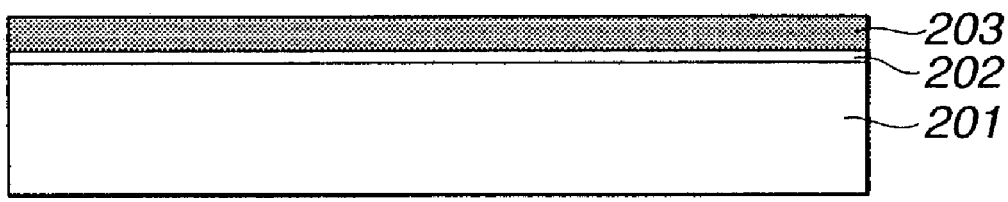
Figure 2C:
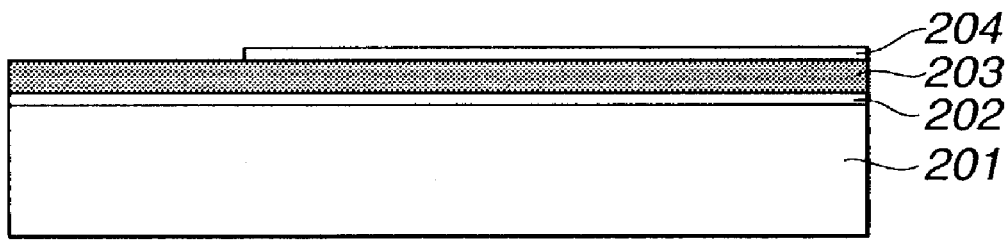
Figure 2D:
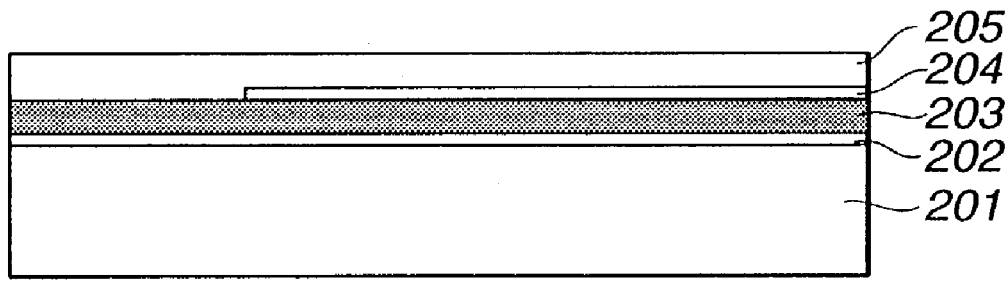

Firstly, as shown in FIG. 2A, a substrate 201 made of a glass substrate whose thickness is 0.5 mm or thinner is prepared, on which is entirely formed a lower electrode 202 made of an aluminum or the like. The reflectance of the lower electrode 202 is preferably high. Next, as shown in FIG. 2B, a luminescent layer 203 made of, for example, an organic EL material is deposited on the lower electrode 202 by vacuum deposition. Subsequently, as shown in FIG. 2C, a transparent electro-conductive film such as an ITO is deposited on the luminescent layer 203 and is patterned in a predetermined shape to be an upper electrode 204. The upper electrode 204 is patterned to correspond to the transmission area included in each pixel on the display panel side. Alternatively, the luminescent layer 203 may be patterned instead of the upper electrode 204. Lastly, as shown in FIG. 2D, the layers composed of the luminescent layer 203 and the upper and lower electrodes 204, 202 are covered with a protective film 205. As the protective film, an insulating film such as a silicon dioxide may be used.

The total thickness of the back light structured as above can be 1 mm or thinner, and thus is a half of the thickness of the conventional LED back light. Also, with respect to luminous efficiency, the organic EL may possibly be greater than the LED.

Figure 3:
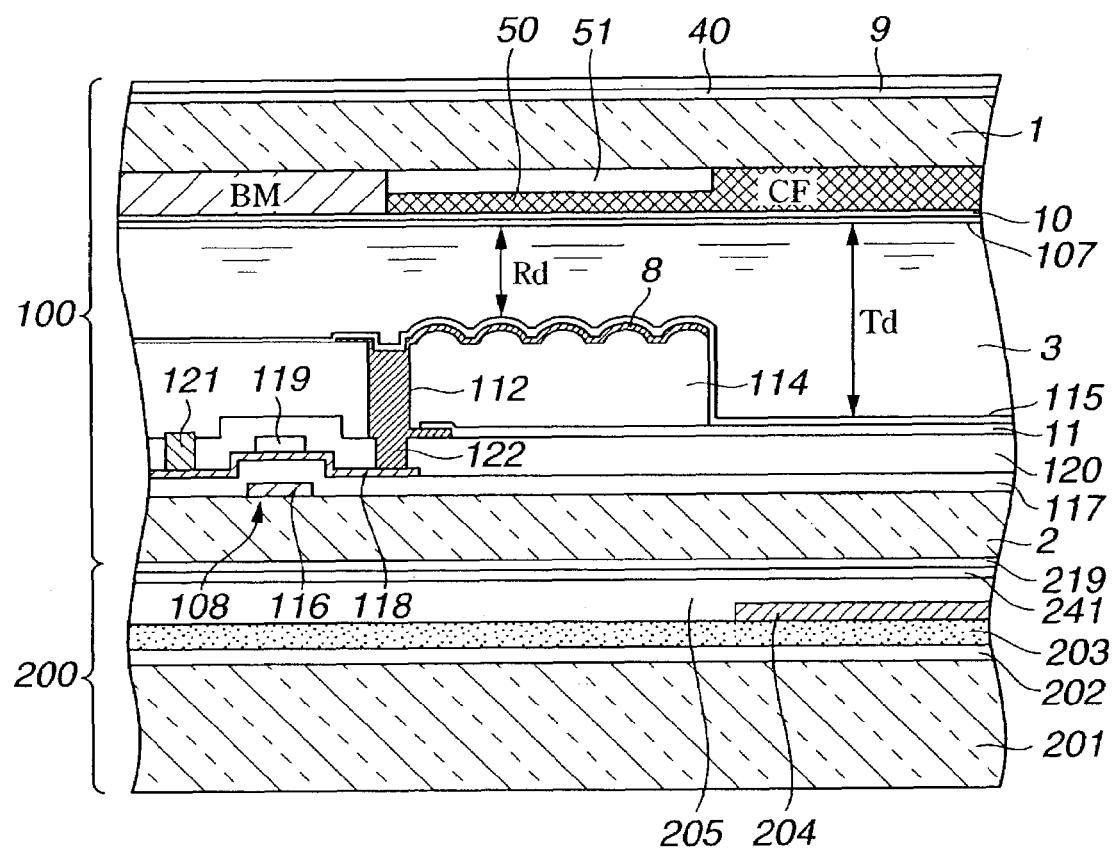
FIG. 3 is a partial cross-sectional view showing a preferred embodiment of the image display apparatus according to the present invention.

FIG. 3 is a partial cross-sectional view schematically showing the image display apparatus according to the present invention for one pixel.

This image display apparatus comprises a hybrid-type liquid crystal panel 100 and a flat-type back light 200. The present embodiment adopts active matrix-type pixels and uses the liquid crystal panel 100 of an ECB (Electrically Controlled Birefringence) mode. That is, the ECB mode is one for controlling incident light to pass or be blocked by using birefringence of the liquid crystal. As an active element for driving the active matrix-type pixels, a thin-film transistor is used.

As shown in FIG. 3, a polarizing plate 40 and a ¼ wavelength plate 9 are mounted on the outer surface of a front substrate 1. On the inner surface of the substrate 1 is formed a color filter CF formed by piling a colored layer 50 and a transparent layer 51. A black matrix BM is also formed on the inner surface of the substrate 1 to partition the color filters CFs per a pixel. On the surface of the color filter CD and the black matrix BM is provided a common electrode 10 commonly formed along pixels. On the common electrode 10 is deposited an orientation film 107. Also, a liquid crystal layer 3 having birefringence is held below the orientation film 107, under which is provided a back substrate 2. The surface of the substrate 2 is covered with an orientation film 115. The orientation film 115 orients the liquid crystal layer 3 horizontally, cooperating with the orientation film 107 of the front substrate 1.

The thickness of the liquid crystal layer 3 is set so that the length in the transmission area Td may be twice as long as the length in the reflection area Rd, as shown in FIG. 3. Specifically, the Td corresponds to a half of the wavelength of incident light, and the Rd corresponds to a quarter of the wavelength of the incident light. Below the orientation film 115 is formed a pixel electrode 11. This pixel electrode 11 is composed of a transparent electro-conductive film such as an ITO, and forms an opening for the transmission area. A reflective layer 8 is formed, part of which is overlapped with the transparent electrode 11, with an insulating film 114 between the reflective layer 8 and the transparent electrode 11. The reflective layer 8 is composed of a metal film formed on the convexoconcave surface of the insulating film 114 and is connected at the same electric potential as that of the above-mentioned pixel electrode 11. Thus, the reflection film 8 constitutes a part of the pixel electrode. Under the pixel electrode 11 is formed a thin-film transistor 108. The thin-film transistor 108 is in a bottom gate structure and has layers of a gate electrode 116, a gate insulating film 117 and a semiconductor thin film 118 layered from the bottom to the top. The semiconductor thin film 118 is composed of a polycrystalline silicon, and its channel area corresponding to the gate electrode 116 is protected by a stopper 119 from the upper side. The thin-film transistor 108 having such a bottom gate structure is covered with an interlayer insulating film 120. The interlayer insulating film 120 has a pair of contact holes, through which a source electrode 121 and a drain electrode 122 are electrically connected to the thin-film transistor 108. These electrodes 121 and 122 are made by patterning e.g., an aluminum. To the drain electrode 122 is connected the aforementioned pixel electrode 11. The reflective layer 8 is also electrically connected to the drain electrode 122 through a contact hole 112 formed on the insulating film 114. On the other hand, signal voltage is supplied to the source electrode 121.

On the substrate 2 at the back side of the liquid crystal panel 100 having such a structure is mounted the flat-type back light 200. The back light 200 has a layered structure by forming a lower electrode 202 on a substrate 201 made of a glass board or the like, on which a luminescent layer 203 is deposited, and further on which an upper electrode 204 is formed. The layers composed of the upper and lower electrodes 204, 202 and the luminescent layer 203 sandwiched inbetween are covered with an insulating protective film 205 such as a silicon dioxide. On the protective film 205 is deposited a polarizing film 241. This polarizing film 241 is a, so to speak, coat-type polarizing plate. That is, as a functional material is coated on the protective film 205, and a predetermined process is carried out on it, the polarizing layer 241 that makes a polarizing effect on illumination light radiated from the luminescent layer 203 can be formed. On the polarizing layer 241 is formed a ¼ wavelength layer 219. The ¼ wavelength layer 219 is made of e.g., a uniaxially oriented optical film and is attached on the coat-type polarizing layer 241.

Figure 4:
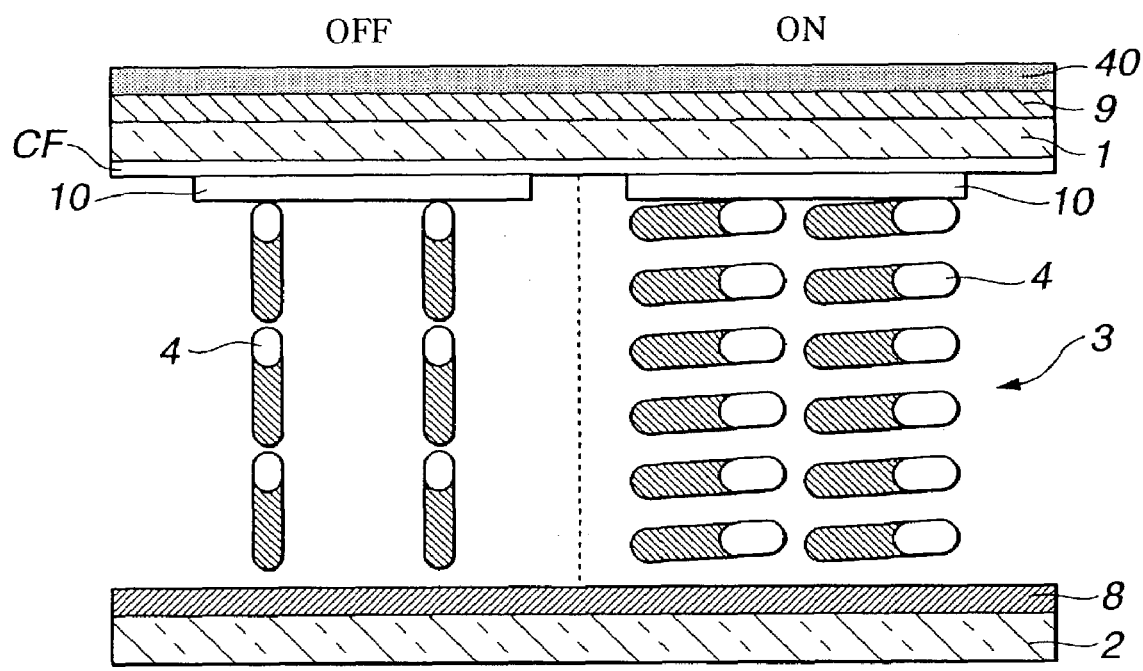
FIG. 4 is a schematic view for explaining an operation of the image display apparatus shown in FIG. 3.

FIG. 4 schematically illustrates an operation of the image display apparatus shown in FIG. 3, and specifically shows a structure of a reflection area. In FIG. 4, the right side shows an off state of applying voltage in which light passes, and the left side shows an on state of the applying voltage in which the light is blocked.

This reflective display apparatus comprises a polarizing plate 40, a ¼ wavelength plate 9, a front substrate 1, a color filter CF, a common electrode 10, a liquid crystal layer 3 having birefringence, a reflective layer 8 also working as a pixel electrode, and a back substrate 2 layered from the top to the bottom. In the off state, liquid crystal molecules 4 are oriented horizontally, and the liquid crystal layer 3 functions as a ¼ wavelength plate. In the on state, the liquid crystal molecules 4 shifts to a vertical orientation, and the liquid crystal layer 3 ceases to function as the ¼ wavelength plate. In other words, in the off state, the liquid crystal layer 3 that functions as the ¼ wavelength plate and the ¼ wavelength plate 9 are overlapped, and they function as a ½ wavelength plate as a whole. As incident light is radiated back and forth through the panel in a case of a reflective type, the panel functions as a one wavelength plate. The one wavelength plate lets the incident light transmitted therethrough back and forth to let it radiated a radiation light as it is. Thus, the incident linearly polarized light transmitted through the polarizing plate 40 reaches an observer as the radiated linearly polarized light as it is, and a state in which light passes can be obtained. On the other hand, in the on state, as the liquid crystal layer 3 ceases to function as a ¼ wavelength plate, only the ¼ wavelength plate 9 plays its role. In a case of a reflective type, as incident light goes back and forth through the ¼ wavelength plate 9, the panel functions as a ½ wavelength plate after all. The ½ wavelength plate turns the incident linearly polarized light by 90° to be made as radiated linearly polarized light. Thus, the incident linearly polarized light transmitted through the polarizing plate 40 is turned by 90°, made as the radiated linearly polarized light, and absorbed in the polarizing plate 40. Thus, a state in which light is blocked can be obtained.

Meanwhile, the operation of the transmission area is similar to that of the above-mentioned reflection area. The transmission area is in a structure in which a portion having a symmetric relation with a portion above the reflective layer 8, with the reflective layer 8 being a border, is provided below the reflective layer 8. That is, the thickness of the liquid crystal layer 3 is twice, and a ¼ wavelength plate 219 and a polarizing layer 241 (refer to FIG. 3) are provided at the back side of the back substrate 2.

Figure 5:
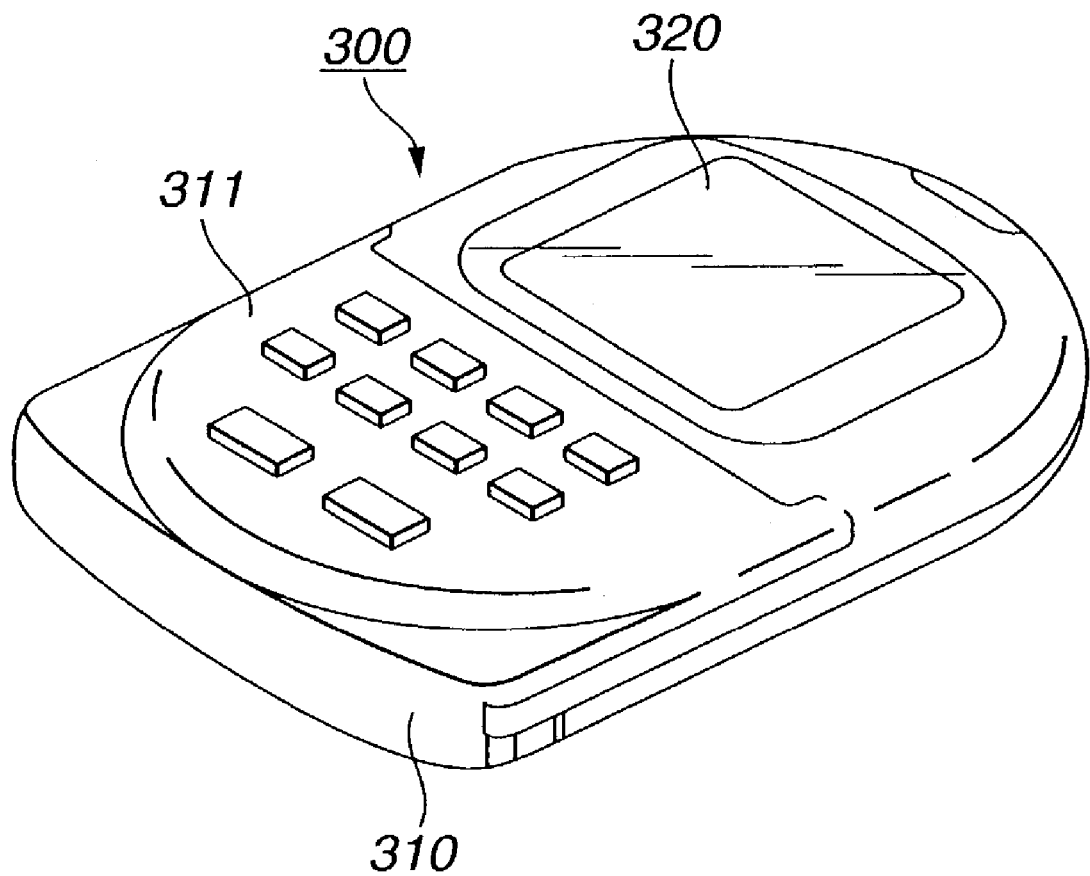
FIG. 5 is a perspective view showing a portable information terminal device to which the present invention is applied.

FIG. 5 is a perspective view showing an example of a portable information terminal device in which the image display apparatus according to the present invention has been incorporated.

A personal digital assistant (PDA) 300 has a compact structure with an operating unit 311 by which commands are inputted, a processing unit 310 for processing information in accordance with the commands, and a display unit 320 for displaying the processed information being integrally incorporated.

The processing unit 310 has basic functions as a PDA, and typically includes a communication section, an audio processor, a controller, a storage section, etc. As a central processing unit (CPU) controls these functions, the PDA 300 implements a telephone function, an electronic mail function, a personal computer function, a PC communication function, a personal information managing function, etc. By operating the operating unit 311, the user can select a variety of functions. The processing unit 310 generates image information in accordance with the contents of the processing to be executed.

The display unit 320 displays the image information generated in the processing unit 310. This display unit 320 comprises a display panel having pixels arranged in a matrix form and displaying images by reflecting external light from the front side or by having illumination light from the back side transmit therethrough, and a flat-type back light arranged at the back of the display panel and radiating the illumination light. Each pixel is divided on a flat surface into a reflection area for reflecting the external light incident from the front side of the display panel to display an image and a transmission area for transmitting the illumination light incident from the back side of the display panel to display an image. The back light is a flat type, with layers consisting of electrodes and a luminescent layer sandwiched inbetween being formed on a substrate, and radiates the illumination light generated from the luminescent layer toward the transmission area of each pixel when voltage is applied between the upper and lower electrodes.

An image display apparatus incorporating a hybrid-type display panel and a flat back light utilizing a self luminous element such as an organic EL is particularly applicable to a display in a portable information terminal device. As for a back light, a self luminous element is used, and thus its thickness can be reduced compared with that of a conventional back light, and the luminous efficiency can be improved. Also, as the back light is used with the hybrid-type display panel, it does not need to be lit while external light is available, thus to reduce electric power consumption. In particular, when the apparatus is manufactured so that a luminescent light may be supplied only to the transmission area of the display panel, it is possible to reduce electric power consumption to a large extent.

Figure 6:
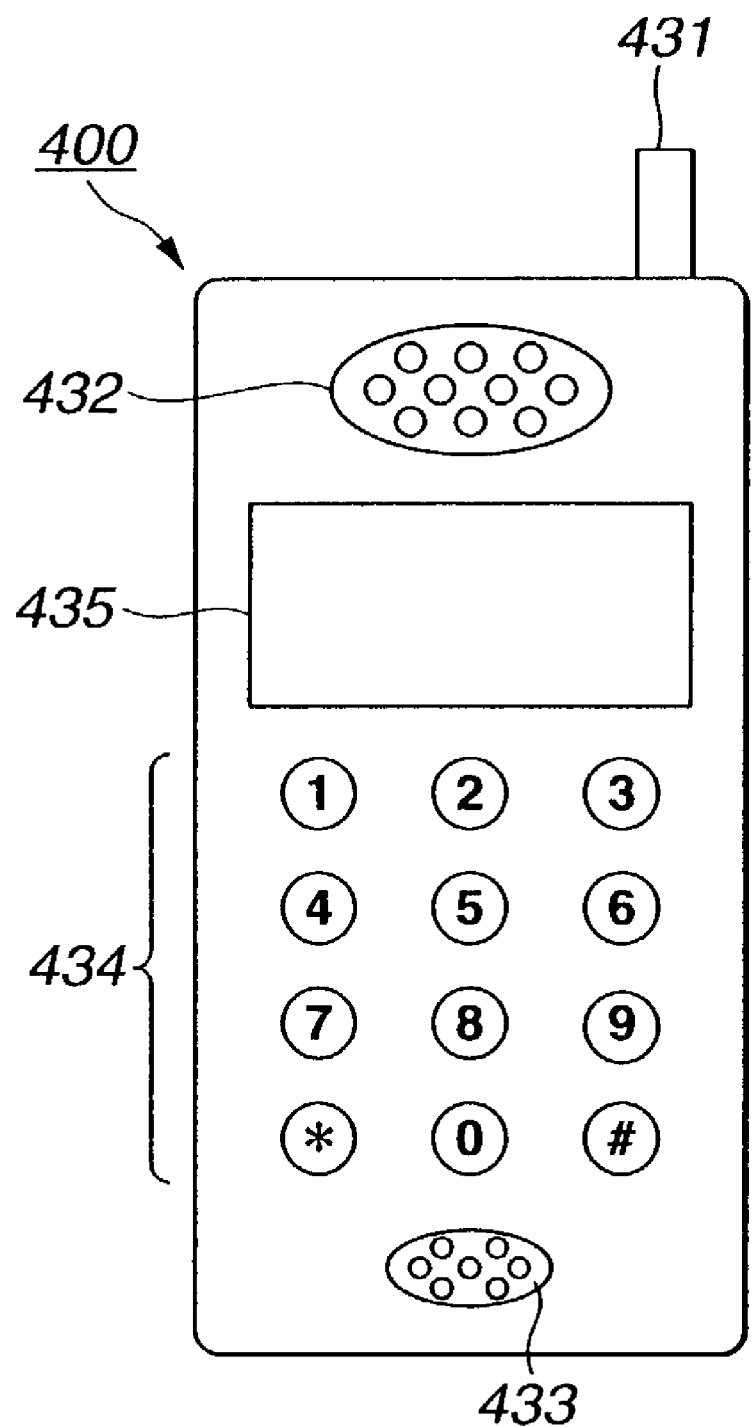
FIG. 6 is a plan view showing a portable telephone terminal device to which the present invention is applied.

FIG. 6 is a schematic plan view showing an example of a portable telephone terminal device in which the image display apparatus according to the present invention has been incorporated.

The portable telephone terminal device has a compact structure with an operating unit for basically allowing a user to perform operations on transmission and reception, a speech unit for allowing the user to speak in accordance with the operations, and a display unit enabling to display at least information on the operations being integrally incorporated.

Specifically, a the portable telephone terminal device 400 comprises an antenna 431 for wireless transmission, a receiver (loudspeaker) 432, a transmitter (microphone) 433, operation keys 434 such as dial keys and an image display unit (display unit) 435, as shown in FIG. 6. This portable telephone terminal device 400 can display telephone directory information such as personal names and phone numbers on the display unit 435. In some cases, the device 400 may display received electronic mails on the display unit 435.

INDUSTRIAL APPLICABILITY

As described above, in the present invention, a hybrid-type display panel and a back light utilizing a self luminescent material are used together. A self luminescent material is exemplified by an organic EL. As the self luminescent material is used for the back light, the thickness of the flat-type back light can be reduced, and thus the thickness of the display module itself can be reduced. Thus, the apparatus of the present invention is applicable particularly to a display unit for a portable information terminal device and a portable telephone terminal device.

The display panel is a hybrid type, with a reflection area and a transmission area being provided together for each pixel, and external light can be used as well as illumination light from the back light, thus to reduce electric power consumption. Thus, the apparatus of the present invention is applicable to a display unit for a portable device. Especially, the shape of the luminescent area of the back light matches that of the transmission area of the display panel, which leads to reduction of the electric power consumption.

The invention claimed is:

1. An image display apparatus comprising:
a display panel having pixels arranged in a matrix form and displaying images by reflecting external light from the front side or by having illumination light from the back side transmit therethrough; and
a flat-type back light arranged at the back of the display panel and radiating the illumination light,
wherein,
each pixel is divided on a flat surface into a reflection area for reflecting the external light incident from the front side of the display panel to display an image and a transmission area for transmitting the illumination light incident from the back side of the display panel to display an image, the transmission area being positioned within a perimeter of the reflection area along the flat surface;
the back light is a flat type with a substrate on which are formed layers consisting of a bottom electrodes, a top electrode, and a luminescent layer sandwiched inbetween the top and bottom electrodes, the back light radiating the illumination light generated from the luminescent layer toward the transmission area of each pixel when voltage is applied between the electrodes, and the top electrode having a shape that matches and is aligned with the shape of the transmission area.

2. The image display apparatus according to claim 1, wherein the luminescent layer is composed of an organic electro-luminescent material.

3. The image display apparatus according to claim 1, wherein the display panel comprises a pair of upper and lower substrates on each of which is formed an electrode, and liquid crystal held between the substrates.

4. The image display apparatus according to claim 3, wherein the back light has a polarizing layer deposited on the layers consisting of the top and bottom electrodes and the luminescent layer sandwiched inbetween the top and bottom electrodes, and the liquid crystal displays an image, effected by the illumination light transmitted through the polarizing layer.

5. A method for manufacturing an image display apparatus including a display panel having pixels arranged in a matrix form and displaying images by reflecting external light from the front side or by having illumination light from the back side transmit therethrough and a flat-type back light arranged at the back of the display panel and radiating the illumination light, the method comprising:

a display panel preparation step of preparing the display panel by integrating on a substrate pixels each of which is divided on a flat surface into a reflection area for reflecting the external light to display an image and a transmission area for transmitting the illumination light to display an image, said display panel preparation step including the step of positioning the transmission area within a perimeter of the reflection along said flat surface;

a back light preparation step of preparing the flat-type back light by forming on a substrate layers consisting of a bottom electrode, a top electrode, and a luminescent layer sandwiched inbetween the top and bottom electrodes; and an assembly step of assembling the back light on the back surface of the display panel so that the illumination light generated from the luminescent layer can be radiated toward the transmission area of each pixel when voltage is applied between the electrodes, wherein in the back light preparation step, the top electrode has a shape that matches and is aligned with the shape of the transmission area.

6. The method for manufacturing an image display apparatus according to claim 5, wherein in the back light preparation step, an organic electro-luminescent material is used as the luminescent layer.

7. The method for manufacturing an image display apparatus according to claim 5, wherein in the display panel preparation step, a pair of upper and lower substrates to each of which is formed an electrode face to each other at a predetermined space, and liquid crystal is held in the space.

8. The method for manufacturing an image display apparatus according to claim 7, wherein in the back light preparation step, a polarizing layer is deposited on the layers consisting of the top and bottom electrodes and the luminescent layer sandwiched inbetween, and the liquid crystal displays an image, effected by the illumination light transmitted through the polarizing layer.

9. A portable information terminal device integrally incorporating an operating unit by which commands are input, a processing unit for processing information in accordance with the commands, and a display unit for displaying the processed information, wherein:

the display unit includes a display panel having pixels arranged in a matrix form and displaying images by reflecting external light from the front side or by having illumination light from the back side transmit therethrough, and a flat-type back light arranged at the back of the display panel and radiating the illumination light;

each pixel is divided on a flat surface into a reflection area for reflecting the external light incident from the front side of the display panel to display an image and a transmission area for transmitting the illumination light incident from the back side of the display panel to display an image, the transmission area being positioned within a perimeter of the reflection area along the flat surface; and the back light is a flat type, with layers consisting of a bottom electrode, a top electrode, and a luminescent layer sandwiched inbetween being formed on a substrate, and radiates the illumination light generated from the luminescent layer toward the transmission area of each pixel when voltage is applied between the electrodes, wherein the top electrode have a shape that matches and is aligned with the shape of the transmission area.

10. The portable information terminal device according to claim 9, wherein the luminescent layer is composed of an organic electro-luminescent material.

11. The portable information terminal device according to claim 9, wherein the display panel comprises a pair of upper and lower substrates to each of which is formed an electrode, and liquid crystal held between the substrates.

12. The portable information terminal device according to claim 11, wherein the back light has a polarizing layer deposited on the layers consisting of the top and bottom electrodes and the luminescent layer sandwiched inbetween, and the liquid crystal displays an image, effected by the illumination light transmitted through the polarizing layer.

13. A portable telephone terminal device integrally incorporating an operating unit for allowing a user to perform operations on transmission and reception, a speech unit for allowing the user to speak in accordance with the operations, and a display unit enabling to display at least information on the operations, wherein:

the display unit includes a display panel having pixels arranged in a matrix form and displaying images by reflecting external light from the front side or by having illumination light from the back side transmit therethrough, and a flat-type back light arranged at the back of the display panel and radiating the illumination light, each pixel being divided on a flat surface into a reflection area for reflecting the external light incident from the front side of the display panel to display an image and a transmission area for transmitting the illumination light incident from the back side of the display panel to display an image, the transmission area lying within a perimeter of the reflection area along the flat surface, the back light being a flat type, with a substrate on which are formed layers consisting of a bottom electrode, a top electrode, and a luminescent layer sandwiched inbetween, backlight radiating the illumination light generated from the luminescent layer toward the transmission area of each pixel when voltage is applied between the electrodes, and the top electrode have a shape that matches and is aligned with the shape of the transmission area.

14. The portable telephone terminal device according to claim 13, wherein the luminescent layer is composed of an organic electro-luminescent material.

15. The portable telephone terminal device according to claim 13, wherein the display panel comprises a pair of upper and lower substrates to each of which is formed an electrode, and liquid crystal held between the substrates.

16. The portable telephone terminal device according to claim 15, wherein the back light has a polarizing layer deposited on the layers consisting of the top and bottom electrodes and the luminescent layer sandwiched inbetween, and the liquid crystal displays an image, effected by the illumination light transmitted through the polarizing layer.

* * * * *